Nov. 3, 1931.　　　　H. O. LINDAAS　　　　1,829,959

COUPLING DEVICE

Filed Feb. 19, 1931

INVENTOR
Henry O. Lindaas
BY J. L. Rivers,
ATTORNEY

Patented Nov. 3, 1931

1,829,959

UNITED STATES PATENT OFFICE

HENRY O. LINDAAS, OF TACOMA, WASHINGTON

COUPLING DEVICE

Application filed February 19, 1931. Serial No. 516,951.

This invention has reference in particular to improvements in devices for coupling trailers to motor vehicles.

In loading and unloading ships from docks and wherein trailers drawn by motor vehicles are utilized, the device commonly employed in coupling the same comprises a pair of apertured lip member connected with the pulling vehicle and adapted to receive the looped terminal of the tongue provided in the type of trailers thus used, the coupling being effected by securing said terminal in said members with a coupling pin. Such a connection can be made only when the vehicles to be coupled are at a standstill, and the coupling pins used, separate parts as they are, often become misplaced or lost. In lieu of the coupling device just referred to, a hook of ordinary form and properly positioned is also utilized in connection with said terminal as a coupler, but the same does not afford positive coupling means as the terminal has a tendency to jolt out and break the coupling, thus introducing a factor which, in view of the weight of the loaded trailers, may prove injurious to the goods being transported or persons adjacent the scene of operation.

This invention, in connection with other of its features, is designed to overcome the disadvantages incident to the use of the coupling devices as mentioned.

Its objects, generally stated, are, to provide a coupling device wherein said looped terminal when properly positioned may be guided into immediate and retaining engagement with a hook; and, on a slight forward movement of the pulling vehicle, will automatically drop into closed coupling position, projecting elements being provided which will positively hold said terminal in closed engagement with the device; to provide a device of this class which may be readily disconnected when the vehicles with which it is associated are still or in motion; and, to provide an instrumentality, characterized as aforesaid, which is of simple construction and attachable to the under side of a vehicle so as to present no outwardly projecting parts and yet being conveniently accessible to the user.

In the accompanying drawings—

Figure 3:
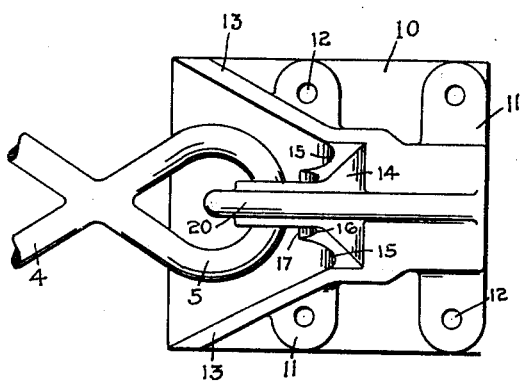
Fig. 3 is an under side view of said device with a loop engaged therein, said loop being broken away; the view being designed to illustrate more particularly the guide means provided for said loop.

Referring more particularly to the drawings, 1 and 2 denote generally a motor truck and a trailer, 3 the body of said truck, 4 a tongue swingingly connected with said trailer, and 5 a looped terminal for said tongue.

The device, preferably made of cast steel and of integral construction, is provided with a plate-like body portion 10 rectangular in outline and having an upper side with a smooth surface. Its under side carries a plurality of boss portions 11, and it is apertured, as at 12, through said portions to accommodate fastening elements. Extending from the under side of said body portion are two guide flanges 13 which converge toward and connect with a coupling member depending from said portion. Said member comprises a body portion 14 having its inner edge formed so as to provide a curved recessed portion 15 merging into said flanges, a second curved recessed portion 16, and a shoulder 17 disposed between the last-named portions. The coupling member also carries an upstanding curved hook 18 having an inwardly curved tip 19, the same being located in spaced and opposed relation to said recessed portions and shoulder. A web portion 20, extending from the body portion 10 and connected with the body portion 14 and said hook, serves to stabilize and strengthen said coupling member.

Figure 2:
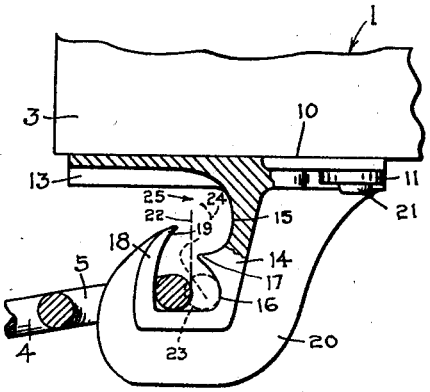
Fig. 2 is an enlarged view of said device partly sectionized, including the looped terminal of said tongue in section and broken away and a fragmentary portion of the body of said truck, said terminal being shown in coupled position.
Figure 1:
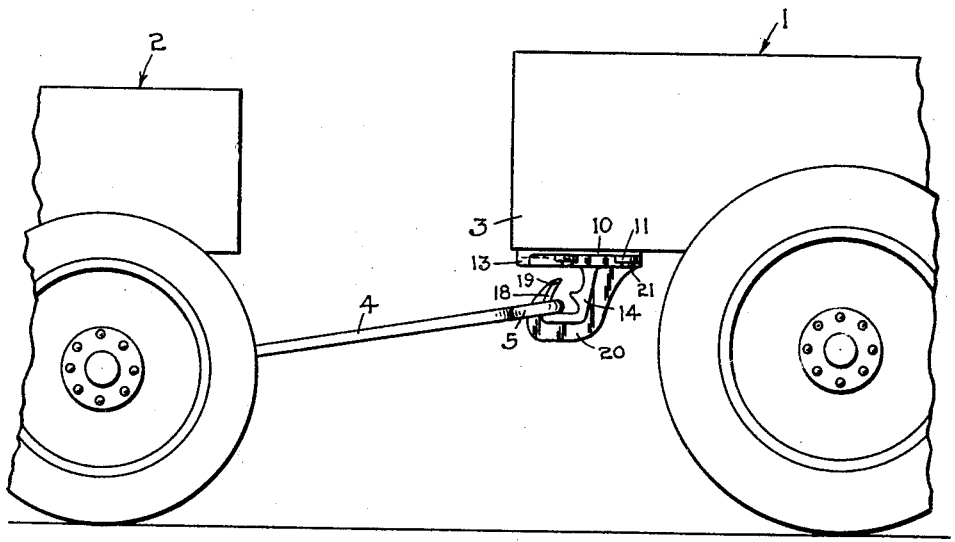
Figure 1 is a fragmentary view in side elevation of a motor truck and a trailer, the device being shown as attached to said truck, and the tongue of the trailer indicated as coupled therewith.

The device having been positioned to the rear under side portion of said truck body, about centrally thereof, and, preferably within the limits of the end of said body, as indicated in Figs. 1 and 2, is secured in place by the bolts 21 and as thus mounted is ready for use.

In utilizing the device to couple up said trailer and motor truck, the user grasps the tongue 4 and through which the looped terminal 5 is placed between the flanges 13 and moved inwardly, the flanges guiding the loop thereof into the coupling member. When the end of the loop reaches the recessed portion 15, the user may then release his hand from the tongue and which will permit the loop to drop through gravity in said portion and rest on the shoulder 17, the tip 19 of the hook then being disposed in the loop. As said truck is moved slightly forwardly, the loop obviously will be released from said shoulder and through its weight will drop into the recessed portion 16 and into closed position, the pull from the truck causing the loop to hug the hook, as indicated in Figs. 1 and 2. Should the pull on the loop be lessened to the extent that the loop might be jolted upwardly, through movement of either vehicle thus coupled, the clearance between the recessed portion 16 and the tip of the hook will be insufficient to permit the loop, when it is disposed against or near the base of the hook, to be disengaged from the coupling member, as indicated by the dotted line 22, Fig. 2. Assuming that movement would be imparted to the loop so that it would extend farther toward or to the limit of the recessed portion 16, the shoulder 17 will prevent it from jolting out of the coupling member. This latter position of said loop is indicated by dotted lines 23, Fig. 2.

In removing the loop from the coupling member, the end of said loop is brought against the edge of the recessed portion 16, as at 23, and following the sinuosities defined by this edge, the shoulder 17 and the recessed portion 15, indicated by the dotted line 24, it may be disengaged from said member and then withdrawn from the device between the flanges 13.

While said loop is normally brought into contact with or released from the coupling member through said flanges, it may be inserted or withdrawn from said member, if desired, from either side of said flanges, enough clearance being provided between either flange and the tip of the hook to permit it to be thus handled, as designated by 25, Fig. 2. In practical operation of the device, the location of a trailer relative to the pulling vehicle may be such as to render the handling of the loop in this manner more convenient and desirable.

I have found through use of this coupling device that vehicles connected thereby may be uncoupled in the manner described while the vehicles are moving, and with facility as the use of one hand only is required. This is particularly effective where trailers of a train are bound for different stopping points, the trailers being arranged so that the rear one may be detached and left at its destination without materially interfering with the progress of the others. In view of the number of men usually employed in loading and unloading said trailers, this, as is evident, will conserve time and consequently expense for labor over the prior and slower practices heretofore referred to.

Changes in and modifications of the construction described may be made without departing from the spirit of my invention or sacrificing its advantages, hence it is asked that I be not confined to the specific structure set forth, except as limited by the appended claims.

I claim:

1. A coupling device, comprising a body portion attachable to a vehicle, a coupling member depending from said portion, said member having an upper and curved recessed portion and a lower and curved recessed portion, a shoulder disposed between and merging into said recessed portions, an upstanding hook provided with an inwardly curved tip, said hook extending from said lower recessed portion and disposed in spaced and opposed relation to said recessed portions and shoulder, and a pair of guide flanges depending from said body portion and converging into said upper recessed portion.

2. A coupling device, comprising a coupling member attachable to a vehicle, said member having an upper recess and a lower recess adapted to accommodate the bight of a coupling loop and permit sliding engagement of said bight therewith, an upstanding hook having an inwardly directed tip, said hook extending from said lower recess and disposed in spaced and opposed relation to said recesses, and means for guiding a coupling loop into said upper recess.

3. A coupling device, comprising in combination with a coupling loop, a body portion, a member for detachably engaging said loop extending from said body portion and having an upper and curved recess and a lower and curved recess, each of said recesses being adapted to accommodate the bight of said loop, a shoulder disposed between and merging into said recesses, an inwardly directed hook extending from said lower recess and located in spaced and opposed relation to said recesses and shoulder, and a pair of guide flanges extending from said body portion and converging into said upper recess, said flanges being spaced from said hook to provide a clearance between said flanges and hook to accommodate said loop.

4. In a coupling device, a coupling member comprising an elongated and depending body portion provided with an inner edge portion, an upper curved recess formed in said edge portion and merging into a shoulder, a lower curved recess formed in said edge portion and merging into said shoulder, and an upstanding curved hook having an inwardly curved tip, said hook extending from said lower recess and disposed in spaced and opposed relation to said recesses and shoulder.

5. In a coupling device, a coupling member of integral construction comprising a body portion having an upper curved seat for the bight of a coupling loop and a lower curved seat for the bight of said loop, a shoulder disposed between and merging into said seats, and a hook, having an inturned tip, extending from said lower seat and spaced from and located oppositely of said seats and shoulder.

HENRY O. LINDAAS.